(12) United States Patent
Voit et al.

(10) Patent No.: US 8,094,663 B2
(45) Date of Patent: Jan. 10, 2012

(54) SYSTEM AND METHOD FOR AUTHENTICATION OF SP ETHERNET AGGREGATION NETWORKS

(75) Inventors: Eric Voit, Bethesda, CA (US); Ian Woo, Raleigh, NC (US); Wayne Roiger, Golden Valley, MN (US)

(73) Assignee: Cisco Technology, Inc., San Jose, CA (US)

(*) Notice: Subject to any disclaimer, the term of this patent is extended or adjusted under 35 U.S.C. 154(b) by 1010 days.

(21) Appl. No.: 11/140,686

(22) Filed: May 31, 2005

(65) Prior Publication Data

US 2006/0268856 A1    Nov. 30, 2006

(51) Int. Cl.
*H04L 12/56* (2006.01)

(52) U.S. Cl. .............. 370/395.2; 370/389; 370/395.3; 370/395.52; 370/395.53; 726/4; 726/5; 726/12; 726/14; 726/17; 726/18; 726/19; 726/21; 709/225; 709/229; 709/232

(58) Field of Classification Search .............. 370/389, 370/401, 395.2, 395.21, 395.3, 395.52, 395.53; 726/4, 16–17, 21; 709/225, 229, 232
See application file for complete search history.

(56) References Cited

U.S. PATENT DOCUMENTS

| | | | |
|---|---|---|---|
| 5,331,637 A | 7/1994 | Francis et al. | |
| 5,818,842 A | 10/1998 | Burwell et al. | |
| 5,848,227 A | 12/1998 | Sheu | |
| 6,055,364 A | 4/2000 | Speakman et al. | |
| 6,073,176 A | 6/2000 | Baindur et al. | |
| 6,078,590 A | 6/2000 | Farinacci et al. | |
| 6,188,694 B1 | 2/2001 | Fine et al. | |
| 6,301,244 B1 * | 10/2001 | Huang et al. | 370/351 |
| 6,304,575 B1 | 10/2001 | Carroll et al. | |
| 6,308,282 B1 | 10/2001 | Huang | |
| 6,373,838 B1 | 4/2002 | Law et al. | |
| 6,424,657 B1 | 7/2002 | Voit et al. | |
| 6,430,621 B1 | 8/2002 | Srikanth et al. | |

(Continued)

FOREIGN PATENT DOCUMENTS

WO    WO 2004/107671 A1 * 12/2004

(Continued)

OTHER PUBLICATIONS

Blunk et al., Draft RFC 2284—Extensible Authentication Protocol (EAP), Feb. 2004.*

(Continued)

*Primary Examiner* — Aung S Moe
*Assistant Examiner* — Hoon J Chung
(74) *Attorney, Agent, or Firm* — The Law Offices of Bradley J. Bereznak (57) ABSTRACT

A Service Provider (SP) authentication method includes receiving a message from a subscriber-premises device, the message being compatible with an authentication protocol and being transported from the subscriber-premises device to a u-PE device operating in compliance with an IEEE 802.1x compatible protocol. Access to the SP network is either allowed or denied access based on a logical identifier contained in the message. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

20 Claims, 5 Drawing Sheets

U.S. PATENT DOCUMENTS

| | | | |
|---|---|---|---|
| 6,470,025 B1 | 10/2002 | Wilson et al. | |
| 6,484,209 B1 | 11/2002 | Momirov | |
| 6,502,140 B1 | 12/2002 | Boivie | |
| 6,519,231 B1 | 2/2003 | Ding et al. | |
| 6,665,273 B1 | 12/2003 | Goguen et al. | |
| 6,667,982 B2 | 12/2003 | Christie et al. | |
| 6,668,282 B1 | 12/2003 | Booth, III et al. | |
| 6,693,878 B1 | 2/2004 | Daruwalla et al. | |
| 6,732,189 B1 | 5/2004 | Novaes | |
| 6,757,286 B1 | 6/2004 | Stone | |
| 6,785,232 B1 | 8/2004 | Kotser et al. | |
| 6,785,265 B2 | 8/2004 | White et al. | |
| 6,789,121 B2 | 9/2004 | Lamberton et al. | |
| 6,798,775 B1 | 9/2004 | Bordonaro | |
| 6,801,533 B1 | 10/2004 | Barkley | |
| 6,829,252 B1 | 12/2004 | Lewin et al. | |
| 6,839,348 B2 | 1/2005 | Tang et al. | |
| 6,850,542 B2 | 2/2005 | Tzeng | |
| 6,852,542 B2 | 2/2005 | Mandel et al. | |
| 6,879,594 B1 | 4/2005 | Lee et al. | |
| 6,882,643 B1 | 4/2005 | Mauger et al. | |
| 6,892,309 B2 | 5/2005 | Richmond et al. | |
| 6,954,436 B1 | 10/2005 | Yip | |
| 7,009,983 B2 | 3/2006 | Mancour | |
| 7,016,351 B1 | 3/2006 | Farinacci et al. | |
| 7,092,389 B2 | 8/2006 | Chase et al. | |
| 7,113,512 B1 | 9/2006 | Holmgren et al. | |
| 7,116,665 B2 | 10/2006 | Balay et al. | |
| 7,173,934 B2 | 2/2007 | Lapuh et al. | |
| 7,277,936 B2 | 10/2007 | Frietsch | |
| 7,310,342 B2 | 12/2007 | Rouleau | |
| 7,315,554 B2 | 1/2008 | Baum et al. | |
| 7,339,929 B2 | 3/2008 | Zelig et al. | |
| 7,345,991 B1 | 3/2008 | Shabtay et al. | |
| 7,408,936 B2 | 8/2008 | Ge et al. | |
| 7,466,703 B1 | 12/2008 | Arunachalam et al. | |
| 7,693,078 B2 | 4/2010 | Gonda | |
| 7,698,456 B2 | 4/2010 | Guichard et al. | |
| 7,701,936 B2 | 4/2010 | Hongal et al. | |
| 7,843,917 B2 | 11/2010 | Brockners | |
| 8,019,082 B1* | 9/2011 | Wiedmann et al. | 380/270 |
| 2002/0032780 A1* | 3/2002 | Moore et al. | 709/228 |
| 2002/0087721 A1 | 7/2002 | Sato et al. | |
| 2002/0156612 A1 | 10/2002 | Schulter et al. | |
| 2002/0196795 A1 | 12/2002 | Higashiyama | |
| 2003/0012183 A1 | 1/2003 | Butler | |
| 2003/0036375 A1 | 2/2003 | Chen et al. | |
| 2003/0101243 A1 | 5/2003 | Donahue et al. | |
| 2003/0110268 A1 | 6/2003 | Kermarec et al. | |
| 2003/0112781 A1 | 6/2003 | Kermode et al. | |
| 2003/0142674 A1 | 7/2003 | Casey | |
| 2003/0154259 A1 | 8/2003 | Lamberton et al. | |
| 2003/0177221 A1 | 9/2003 | Ould-Brahim et al. | |
| 2004/0078469 A1 | 4/2004 | Ishwar et al. | |
| 2004/0081171 A1 | 4/2004 | Finn | |
| 2004/0095940 A1 | 5/2004 | Yuan et al. | |
| 2004/0102182 A1* | 5/2004 | Reith et al. | 455/410 |
| 2004/0107382 A1 | 6/2004 | Doverspike et al. | |
| 2004/0125809 A1 | 7/2004 | Jeng | |
| 2004/0133619 A1 | 7/2004 | Zelig et al. | |
| 2004/0141501 A1 | 7/2004 | Adams et al. | |
| 2004/0151180 A1 | 8/2004 | Hu et al. | |
| 2004/0158735 A1 | 8/2004 | Roese | |
| 2004/0165525 A1 | 8/2004 | Burak | |
| 2004/0165600 A1 | 8/2004 | Lee | |
| 2004/0172559 A1* | 9/2004 | Luo et al. | 713/201 |
| 2004/0213201 A1 | 10/2004 | Osterlund | |
| 2004/0228291 A1 | 11/2004 | Huslak et al. | |
| 2004/0233891 A1 | 11/2004 | Regan | |
| 2004/0264364 A1 | 12/2004 | Sato | |
| 2005/0007951 A1 | 1/2005 | Lapuh et al. | |
| 2005/0025143 A1 | 2/2005 | Chen et al. | |
| 2005/0030975 A1 | 2/2005 | Wright et al. | |
| 2005/0044265 A1 | 2/2005 | Vinel et al. | |
| 2005/0063397 A1 | 3/2005 | Wu et al. | |
| 2005/0068972 A1 | 3/2005 | Burns et al. | |
| 2005/0086346 A1* | 4/2005 | Meyer | 709/229 |
| 2005/0089047 A1 | 4/2005 | Ould-Brahim et al. | |
| 2005/0099949 A1 | 5/2005 | Mohan et al. | |
| 2005/0152370 A1 | 7/2005 | Meehan et al. | |
| 2005/0157664 A1 | 7/2005 | Baum et al. | |
| 2005/0157751 A1 | 7/2005 | Rabie et al. | |
| 2005/0163049 A1 | 7/2005 | Yazaki et al. | |
| 2005/0175022 A1 | 8/2005 | Nishimura et al. | |
| 2005/0190773 A1 | 9/2005 | Yang et al. | |
| 2005/0193385 A1 | 9/2005 | Heer et al. | |
| 2005/0239445 A1 | 10/2005 | Karaogguz et al. | |
| 2005/0249124 A1 | 11/2005 | Elie-Dit-Cosaque et al. | |
| 2005/0265329 A1 | 12/2005 | Havala et al. | |
| 2006/0007867 A1 | 1/2006 | Elie-Dit-Cosaque et al. | |
| 2006/0092847 A1 | 5/2006 | Mohan et al. | |
| 2006/0098607 A1 | 5/2006 | Zeng | |
| 2006/0109802 A1 | 5/2006 | Zelig et al. | |
| 2006/0126496 A1 | 6/2006 | Filsfils et al. | |
| 2006/0182037 A1 | 8/2006 | Chen et al. | |
| 2006/0198323 A1 | 9/2006 | Finn | |
| 2006/0248227 A1 | 11/2006 | Hato | |
| 2006/0248277 A1 | 11/2006 | Pande | |
| 2006/0253530 A1* | 11/2006 | Wu et al. | 709/204 |
| 2006/0262794 A1 | 11/2006 | Livet et al. | |
| 2006/0285500 A1 | 12/2006 | Booth | |
| 2006/0285501 A1 | 12/2006 | Damm | |
| 2007/0076719 A1 | 4/2007 | Allan et al. | |
| 2007/0133564 A1 | 6/2007 | Chun et al. | |
| 2008/0144657 A1 | 6/2008 | Li | |
| 2008/0172497 A1 | 7/2008 | Mohan et al. | |
| 2009/0129386 A1* | 5/2009 | Rune | 370/392 |

FOREIGN PATENT DOCUMENTS

| | | |
|---|---|---|
| WO | WO 2007/031002 A | 3/2007 |
| WO | WO 2008/089370 | 7/2008 |

OTHER PUBLICATIONS

Light Reading, Inc., Distributed-Edge Architecture, Nov. 25, 2003.*
Landron, Use of the IEEE Assigned Type Field with IEEE Std 802.3, 1998 Edition Local and Metropolitan Area Networks, Apr. 16, 2004.*
Aboba et al., RFC 3748—Extensible Authentication Protocol (EAP), Jun. 2004, IETF.*
Wolfe, [dhcwg] Publication of draft-droms-agentopt-8021x-00.txt, Nov. 22, 2001, IETF.*
Cisco, Delivering Multicast Video over Asymmetric Digital Subscriber Line, 1999, Cisco.*
Flannagan et al., Cisco Catalyst QoS: Quality of Service in Campus Networks, Jun. 6, 2003, Cisco Press, chapter 8, section 4.*
Lahti "Quality of Service in the Poin-to-Point Protocol over Ethernet" in: Google Scholar (on line, <URL:http://www.e.kth.se/~e95_pla/exjobb/doc/Lahti_Thesis_QoS_in_PPPoE.pdf>) Oct. 1, 2000.
Do-Wire Edge-To Edge (PWE3) Working Group, Simon Delord, UECOMM; Philippe Niger, France Telecom; Yuichi Ikejiri, Yuichiro Wada, NTT Debor: "PWE3 Applications & OAM Scenarios; draft-delord-pwe3-oam-applications 02.txt" Standard-Working-Draft, Internet Engineering Task Force, IETF, CH, No. 2,) Oct. 1, 2005, XP015042128 ISSN: 0000-0004 abstract p. 10, paragraph 3 Section 3.1.1.1. on pp. 12-13; http://ftp.ist.utl.pt/pub/drafts/draft-delord-pwe3-oam-applications-02.txt.
Marc Lasserre et al., "Virtual Private LAN Services over MPLS", Mar. 2003, Internet Draft Document, pp. 4-22.

* cited by examiner

SYSTEM AND METHOD FOR AUTHENTICATION OF SP ETHERNET AGGREGATION NETWORKS

FIELD OF THE INVENTION

The present invention relates generally to data communications systems; more specifically, to security systems and authentication techniques in service provider (SP) networks.

BACKGROUND OF THE INVENTION

A comprehensive computer network security policy is ordinarily designed to achieve specific goals, such as preventing outsiders (e.g., external hackers) from accessing the network; allowing only authorized users into the network; preventing internally sourced network attacks, usually by enforcing accountability for actions or usage; and to provide different layers of access for different categories or kinds of users. To be effective, the security policy should achieve each of the above goals in a way that does not disrupt business or make authorized access prohibitively difficult. A variety of network security systems and methods for achieving these goals are disclosed in U.S. Pat. Nos. 6,826,698; 6,763,469; 6,611,869; and 6,499,107.

A number of different network protocols have been developed to address the need for identifying and authenticating users who want to access a network. For example, Extensible Authentication Protocol (EAP) is a flexible protocol used to carry authentication information, which can include identities, passwords, or predefined security keys. EAP, however, is not a transport protocol; rather, it typically operates on another protocol that behaves as the transport, carrying the authentication information between the client and the authenticating authority. By way of example, EAP may operate on the Remote Authentication Dial-In User Service (RADIUS) protocol that is commonly used to communicate between a network device and an authentication server or database. Acting as a transport for EAP messages, RADIUS allows a network device to securely pass communication of login and authentication credentials (e.g., username/password).

Another well-known transport mechanism is the point-to-point protocol (PPP) which is commonly used by Internet users when they dial into a remote access server point-to-point link. Built into PPP is a Link Control Protocol (LCP) that establishes a link layer connection and can optionally negotiate an authentication protocol to authenticate users requesting network access.

Digital Subscriber Line (DSL) technology is widely-used today for increasing the bandwidth of digital data transmissions over the existing telephone network infrastructure. Other types of Layer 1 transport mechanisms in use include Fiber-To-The-Home (FTTH) and WIMAX. In a typical DSL system configuration, a plurality of DLS subscribers are connected to a service provider (SP) network through a Digital Subscriber Line Access Multiplexer (DSLAM), which concentrates and multiplexes signals at the telephone service provider location to the broader wide area network. Basically, a DSLAM takes connections from many customers or subscribers and aggregates them onto a single, high-capacity connection. The DSLAM may also provide additional functions such as routing or Internet Protocol (IP) address assignment for the subscribers.

Asynchronous Transfer Mode (ATM) protocol networks have traditionally been utilized for communications between DSLAM devices and web servers such as Broadband Remote Access Servers (BRAS). A BRAS is a device that terminates remote users at the corporate network or Internet users at the Internet service provider (ISP) network, and commonly provides firewall, authentication, and routing services for remote users. The ATM protocol is an international standard in which multiple service types are conveyed in fixed-length "cells" over point-to-point network connections. Data packet cells travel through the network from the user network interface (UNI) through the ATM switch to the network node interface (NNI) through a process called Virtual Path Identifier/Virtual Channel Identifier (VP/VCI) translation.

SP access networks are being migrated away from ATM protocol networks to Ethernet networks. Ethernet is a technology that originated based on the idea of peers on a network sending messages in what was essentially a common wire or channel. Each peer has a globally unique key, known as the Media Access Control (MAC) address to ensure that all systems in an Ethernet have distinct addresses. Most modern Ethernet installations use Ethernet switches (also referred to as "bridges") to implement an Ethernet "cloud" or "island" that provides connectivity to the attached devices. The switch functions as an intelligent data traffic forwarder in which frames are sent to ports where the destination device is attached. Examples of network switches for use in Ethernet network environments are found in U.S. Pat. Nos. 6,850,542, 6,813,268 and 6,850,521.

A widely-used prior art protocol for authenticating DSL subscribers connecting through an Ethernet access network is known as the Point-to-Point Protocol over Ethernet (PPPoE). The PPPoE protocol, which is described in RFC 2516 ("A Method for Transmitting PPP over Ethernet", February 1999), basically specifies how to connect Ethernet users to the Internet through a common broadband medium such as a DSL. But because PPPoE is point-to-point connection-oriented, as opposed to multipoint IP over Ethernet, it suffers certain inherent drawbacks that have made PPPoE increasingly unattractive as a transport protocol as new services such as voice and video are layered onto SP networks.

Thus, what is a needed is a new authentication mechanism for subscriber broadband aggregation networks that rely on Ethernet technology.

BRIEF DESCRIPTION OF THE DRAWINGS

The present invention will be understood more fully from the detailed description that follows and from the accompanying drawings, which, however, should not be taken to limit the invention to the specific embodiments shown, but are for explanation and understanding only.

DETAILED DESCRIPTION

An end-to-end solution for authentication of SP subscribers coming into an Ethernet access network is described. In the following description specific details are set forth, such as device types, protocols, configurations, etc., in order to provide a thorough understanding of the present invention. However, persons having ordinary skill in the networking arts will appreciate that these specific details may not be needed to practice the present invention.

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Figure 5:
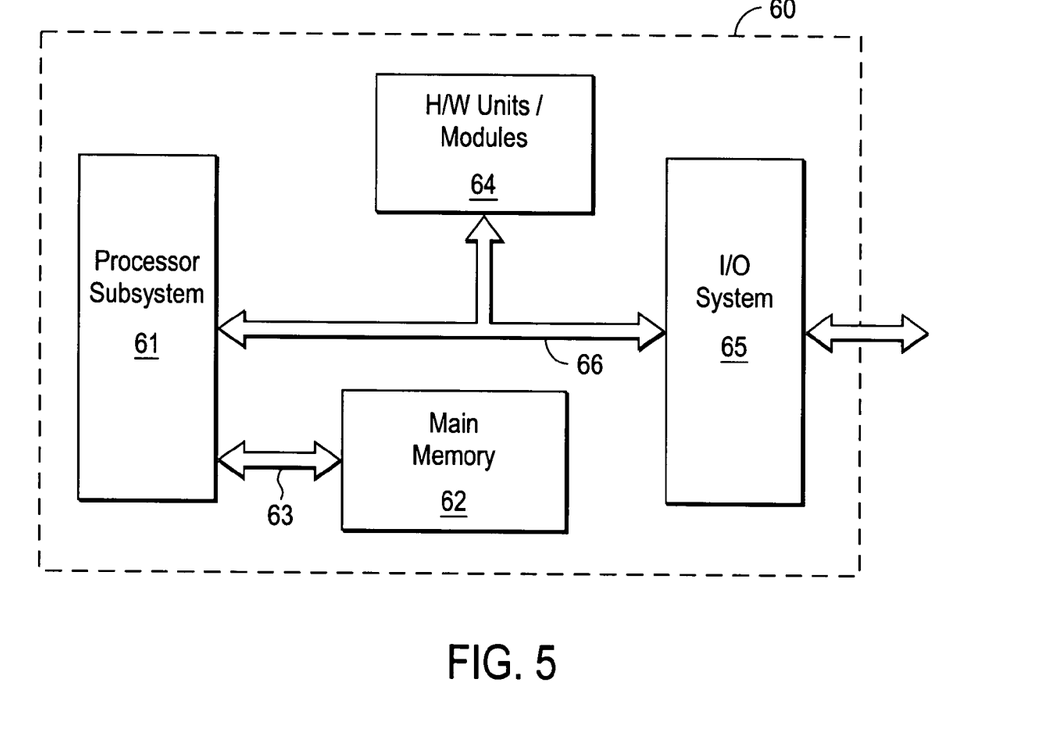
FIG. 5 is a generalized circuit schematic block diagram of a network node.

As shown in FIG. 5, each node 60 typically comprises a number of basic subsystems including a processor subsystem 61, a main memory 62 and an input/output (I/O) subsystem 65. Data is transferred between main memory ("system memory") 62 and processor subsystem 61 over a memory bus 63, and between the processor and I/O subsystems over a system bus 66. Examples of the system bus may include the conventional lightning data transport (or hyper transport) bus and the conventional peripheral component [computer] interconnect (PCI) bus. Node 60 may also comprise other hardware units/modules 64 coupled to system bus 66 for performing additional functions. Processor subsystem 61 may comprise one or more processors and a controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of the system bus to access a next descriptor ring to obtain a next buffer address in the system memory at which it may, e.g., store ("write") data contained in the packet. The DMA engine may need to issue many write operations over the system bus to transfer all of the packet data.

The present invention utilizes the IEEE 802.1x specification as a component of a cross-platform authentication mechanism in subscriber broadband aggregation networks. The IEEE 802.1x specification (also referred simply as "802.1x") is a set of standards that describe a Layer 2 (L2) protocol used for transporting higher-level authentication protocols, which means that it may carry credential information, e.g., username and password information, between an endpoint (client) and an authenticator device. The 802.1x specification is capable of opening and closing on multiple Ethertypes (e.g., IP, PPPoE, AppleTalk, etc.) at once.

In accordance with one embodiment of the present invention, 802.1x may be used to connect a subscriber-premises device, such as a customer edge (CE) or residential gateway (RG) device, to an Ethernet aggregation switch located one or more hops back in the SP network such that all traffic can be authorized at a single L2 UNI. (A hop is known as a measure of distance between two points, e.g., nodes or gateways, in a network.) This enables authentication of non-IP end-user services such as Virtual Private LAN Service (VPLS) that may provide multipoint Ethernet services, Ethernet Relay Service, Ethernet Private Line, and other L2 & L3 services.

The L2 UNI may comprise a variety of different devices, including: a physical Layer 1 (L1) port termination; an ATM switch; a MAC address residing one or more L2 hops back from a CE/RG, wherein the MAC address is utilized to identify and authorize the corresponding CE/RG; a virtual MAC address (vMAC) corresponding to a physical port on a L1 aggregation device such as a DSLAM; or a set of MAC addresses corresponding to a single port. The port may be identified, for example, by a MAC mask. As will be seen shortly, the authentication mechanism of the present invention allows authorization of a number of ports to all application layer services, or, alternatively, to a subset of those services on an individual (per application layer service) basis.

In addition to authentication, according to one embodiment of the present invention, 802.1x may be utilized as part of an end-to-end authentication, authorization, and accounting (AAA) mechanism that permits L2 and L3 policies to be applied to the L2 endpoint. This could include quality of service (QoS) configurations for authorized ports, and default resources allowed for authenticated/unauthorized ports, such as a dashboard/provisioning web server.

Figure 1:
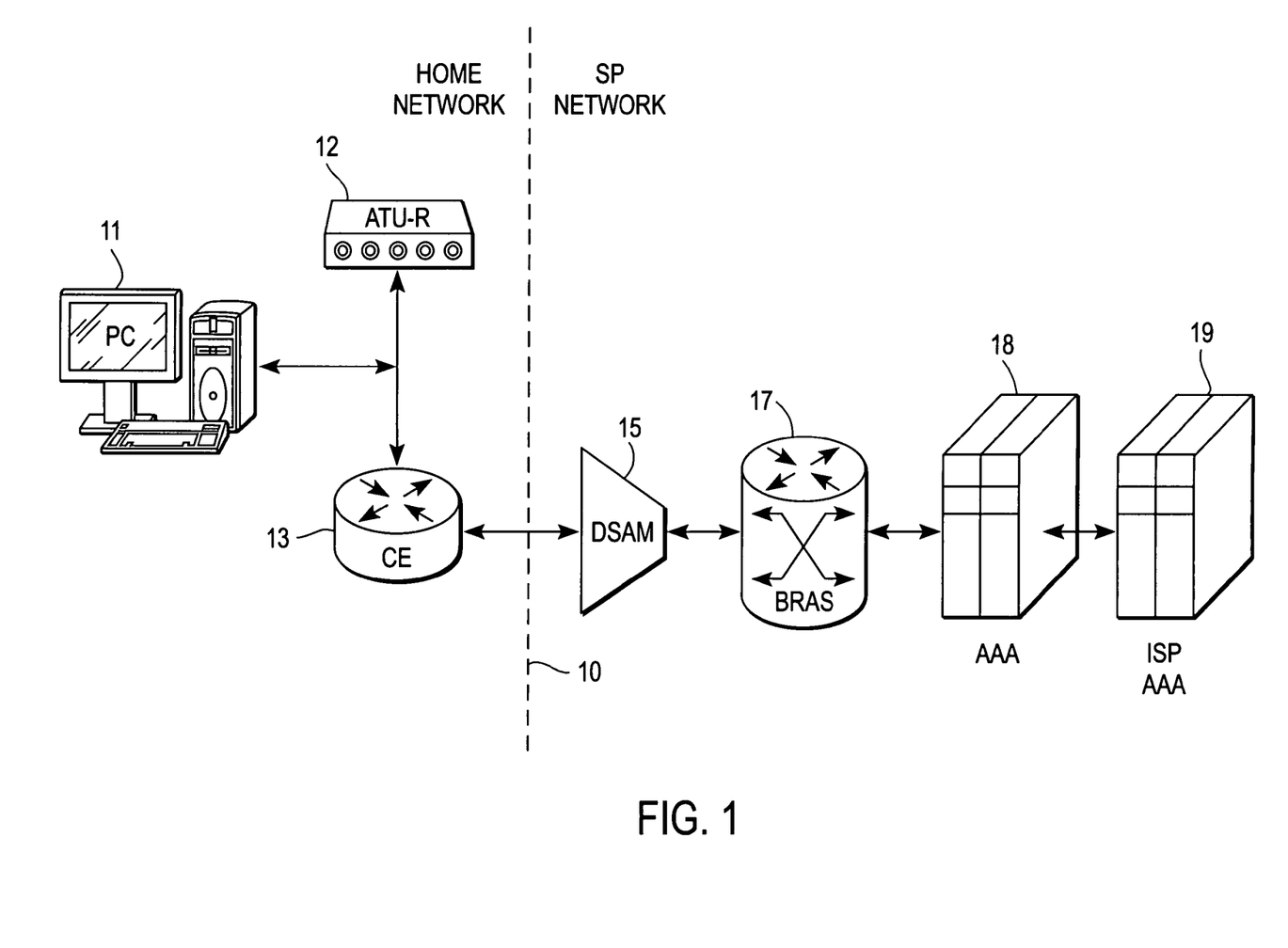
FIG. 1 is a diagram showing a network topology according to one embodiment of the present invention.

FIG. 1 is a diagram showing a network topology according to one embodiment of the present invention, wherein an exemplary home network (client side) is depicted to the left of dashed line 10, and a SP network (server side) is shown to the right. In accordance with the embodiment shown, the authentication protocol is enabled on both sides of dashed line 10. The client side includes a CE device coupled with a personal computer (PC) 11, which, in this example, is the unit or box being authenticated. In IEEE jargon, PC 11 is commonly referred to as the "requester" or "supplicant".

Also shown on the client side coupled to PC 11 and CE device 13 is a hardware unit 12 known as an asymmetric digital subscriber line (ADSL) modem, which is often referred to as an ATU-R (ADSL Terminal Unit—Remote). In the example of FIG. 1, ATU-R unit 12 provides DSL physical layer encoding of bits for transport over copper telephone wires. Together, CE device 13 and ATU-R unit 12 may be considered as the residential gateway (RG) to the SP network. The RG basically has the same relationship upstream (i.e., to the right in FIG. 1) as a PC bridged through an edge router. It is appreciated that other embodiments may utilize other Layer 1 transport mechanisms, such as FTTH or WIMAX.

On the SP network side of FIG. 1, CE device 13 connects to a DSLAM device 15, which, in one implementation functions as the authenticator device. Alternatively, the authentication function may be incorporated a user-facing provider edge (u-PE) device located one or more hops upstream (e.g., see FIGS. 3 & 4). In FIG. 1, a Broadband Remote Access Servers (BRAS) 17 basically functions as a u-PE device. A BRAS is a device that terminates remote users at the corporate network or Internet users at the Internet service provider (ISP) network, and may provide firewall, authentication, and routing services for remote users. In this case, BRAS 17 is coupled with many DSLAMs and is used for aggregating or concentrating subscriber traffic in a single place or node on the SP network.

Further upstream, BRAS 17 is shown connected with an AAA server 18, which, in turn is connected with an Internet Service Provider (ISP) AAA server 19. AAA server 18 functions as a single source facility or database for storing user information that includes user identity and authorization credentials. AAA server 18 is also typically referred to as a RADIUS server, since the RADIUS protocol is the current standard by which devices or applications communicate with the AAA server. It should be understood that the authentication server and the authenticator could be located in different administrative domains (e.g., to accommodate wholesale as well as retail access). In still other embodiments, multiple versions of the IEEE 802.1x compatible protocol may run on different points in the access network. It is also possible to have multiple supplicants associated with a CE or RG device connecting to different points in the network.

ISP AAA server 19 is an optional device in the network topology of FIG. 1. ISP AAA server 19 is shown connected with AAA server 18 since, in certain cases, it may be desirable to validate a user's credentials and other user information with other companies (e.g., Internet access providers) to control access to their subscriber databases.

Figure 2:
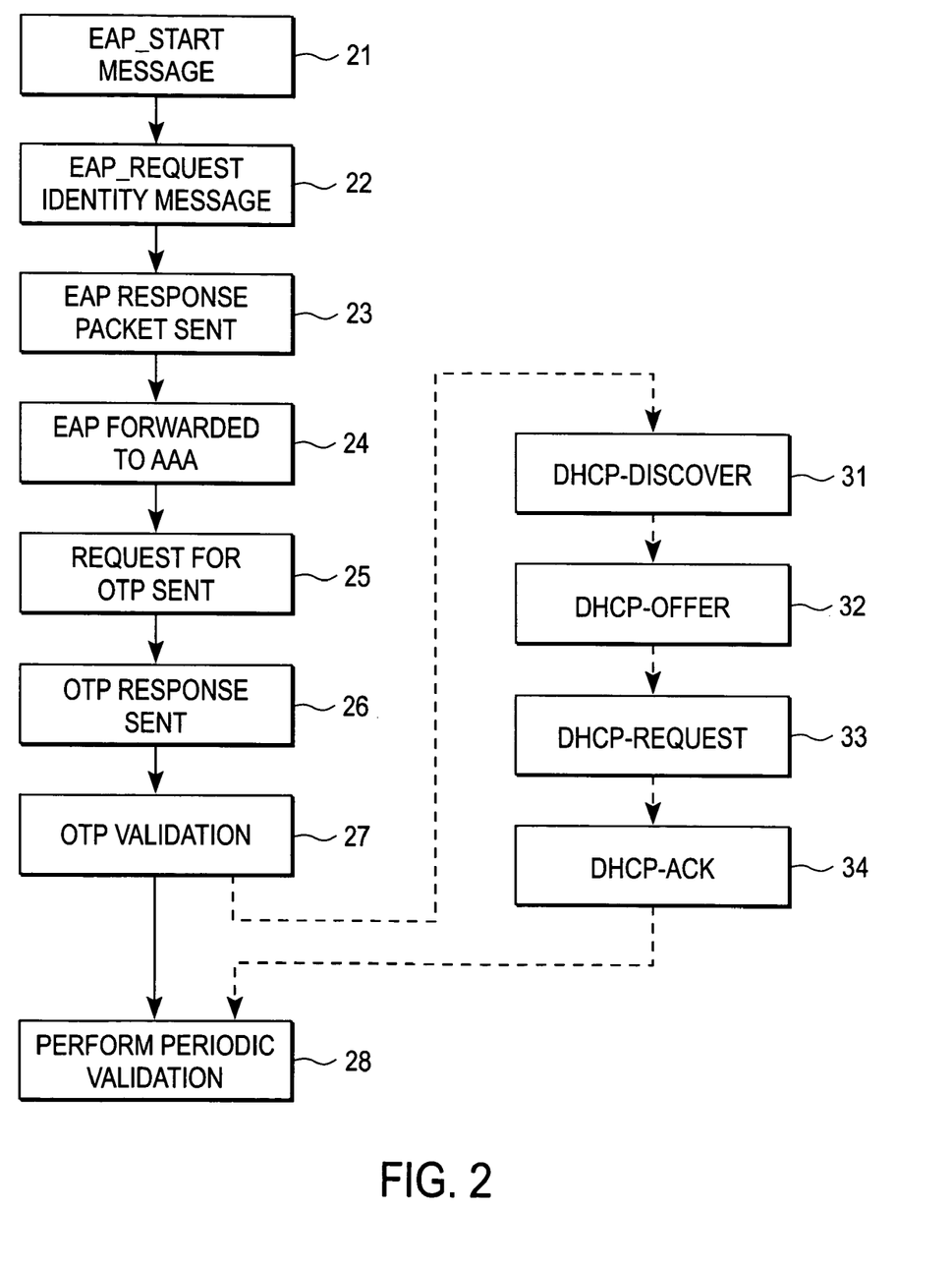
FIG. 2 is a call flow diagram that illustrates the process of authenticating a client's identity in accordance with one embodiment of the present invention.

FIG. 2 is a call flow diagram that illustrates the process of authenticating a client's identity in accordance with one embodiment of the present invention. With reference also to FIG. 1, the authentication process begins with the client or supplicant (e.g., PC 11) sending an EAP_Start message (block 21) to BRAS 17. The EAP_Start message is a standard EAP type message that runs on top of the 802.1x protocol in accordance with the present invention for the purpose of initiating the process of obtaining access to the network. After receiving EAP_Start message, BRAS 17 responds by sending back an EAP_Request_Identity message (block 22), asking for certain user information (e.g., identity and credentials). At block 23, the client sends back an EAP_Response_Identity packet to BRAS 17 that contains the requested identity information.

Upon receipt of the EAP_Response_Identity packet, BRAS 17 extracts the user identity information from the EAP response payload and encapsulates that information in a RADIUS authentication access request that is forwarded to AAA server 18, which functions as an 802.1x authentication server in this example. This event is shown occurring in FIG. 2 by block 24. In one implementation, based on the identity of the client, AAA server 18 is configured to authenticate via a specific authentication algorithm. Thus, AAA server 18 may request a one-time password (OTP) from the client. The OTP request is sent to BRAS 17. BRAS 17, in turn, processes the OTP request by encapsulating it into an 802.1x message, which is sent to the supplicant (block 25).

When the client (e.g., PC 11) receives the OTP request message, it calculates an OTP based on an internally stored key. For example, a Public Key Infrastructure (PKI) digital certificate or key may be used to provide encrypted identity authentication (password) information. In FIG. 2, the OTP is shown being sent by PC 11 to BRAS 17 at block 26. BRAS 17 then extracts/encapsulates the OTP and sends it to AAA server 18. AAA server 18 validates the OTP and either allows or denies network access to the client based on the credential provided (block 27). Upon validation, AAA server 18 returns an Access_Accept message to BRAS 17, which then sends an EAP_Success message to the client over the 802.1x transport protocol. BRAS 17 then notifies the client of the success and transitions the client's port to an authorized state, wherein traffic may thereafter be forwarded across the network. It is appreciated that the 802.1x protocol may require that the validation process shown by blocks 25-27 be periodically repeated to validate that the client is still authorized to connect to the SP network (block 28).

FIG. 2 also shows an optional Dynamic Host Configuration Protocol (DHCP) process that may be used to provide PC 11 with an IP address, if the client does not yet have one. Note that the standard DHCP process shown by blocks 31-34, commence after the client's access credentials have successfully validated via 802.1x authentication (block 27); that is, the BRAS port may begin accepting frames other than those containing EAP information after the client has received authorization to access the network. Until that time, the port on BRAS 17 is closed to all traffic, except EAP messaging.

Figure 3:
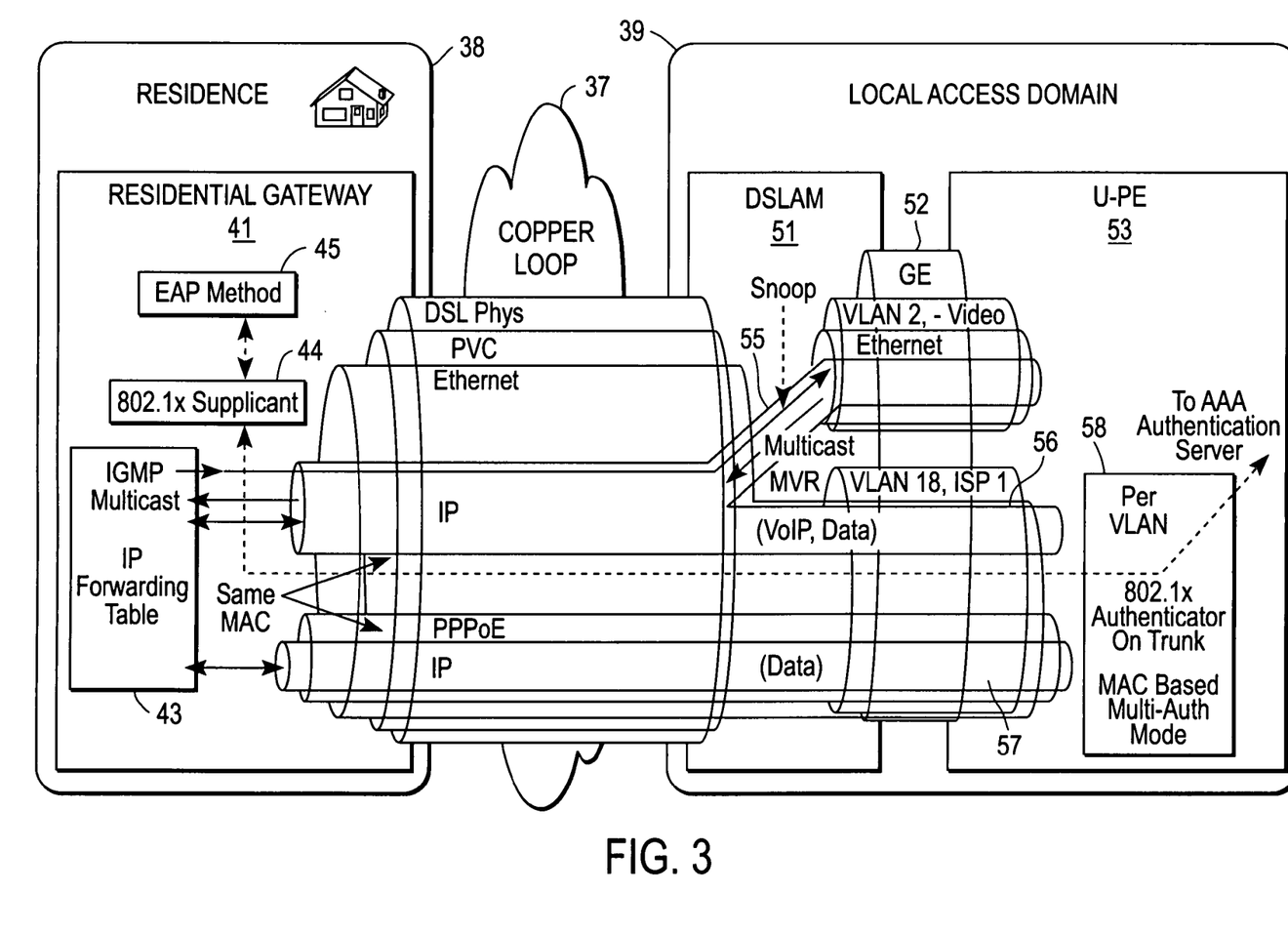
FIG. 3 is a diagram of a user network interface to a local access domain of a service provider network in accordance with one embodiment of the present invention.

FIG. 3 is a diagram of a user network interface to a local access domain of a service provider network in accordance with one embodiment of the present invention. In FIG. 3, a residence 38 is shown connected with a local access domain 39. Various layers of the connection are shown, beginning with copper loop 37 behind the DSL physical layer, which provides the mechanism for encoding digital information sent over the copper wires. The example of FIG. 3 also shows a Permanent Virtual Connection (PVC)—which essentially is a fixed virtual circuit between two network devices that functions as the public data network equivalent of a leased line— encapsulated within the Layer 2 protocol. However, it should be understood that PVC is not required for implementing the present invention. Instead of PVC, the connection protocol could, for example, be native Ethernet over DSL.

In the embodiment of FIG. 3, Layer 3 voice over IP (VoIP) and data services are shown encapsulated in Ethernet for transmission between RG 41 and u-PE device 53 via path 56 (e.g., VLAN 18, ISP 1). Video services are split in DSLAM 51 for direct connection to u-PE device 53 via path 55 (e.g., VLAN 2, Video). In accordance with the embodiment shown, video services may be split-off before passing through the authentication mechanism. DSLAM 51 is configured to snoop on a user request to join a multicast video program, with Multicast VLAN Registration (MVR) permitting the use of different sets of authentication rules for video service. In this way, a customer may receive a set of basic channels that is not dependent upon 802.1x authentication credentials. This aspect of the present invention is discussed in more detail below.

The connection 52 between DSLAM 51 and u-PE device 53 in the example of FIG. 3 comprises a gigabit Ethernet (GE) physical link. Additionally, IP data service is shown encapsulated within PPPoE between RG 41 and u-PE device 53 via path 57.

Residential gateway 41 may comprise a routed gateway that provides L3 IP services for all networked devices within residence 38. By way of example, RG 41 may include a hardware unit 43 (e.g., a set-top box), an 802.1x supplicant device 44 (e.g., a PC) and a unit or module 45 that implements the methodologies of the EAP protocol. Practitioners in the networking arts will understand that each of the elements/ functional units shown comprising RG 41 may be implemented by a single device, or distributed among multiple devices (e.g., a PC, ATU-R, CE, etc.) having one or more processors.

As can be seen, unit 43 runs Internet Group Management Protocol (IGMP) for RG 41 to report its multicast group membership(s) to DSLAM 51 and/or u-PE 53. Unit 43 also includes an IP forwarding table for storing IP address information for communications across the network. Other devices in residence 38 may pass traffic through unit 43 or be provided with IP address information directly from the network.

In the embodiment of FIG. 3, u-PE device 53 includes an 802.1x authenticator unit (or software/firmware module) 58 that provides the same functionality as BRAS 17 in the previous example. That is, unit 58 communicates with RG 41 and an AAA server (not shown) to authenticate a supplicant that requests access to the network. The 802.1x authentication protocol terminates at unit 58. In this example, since there may be many DSLAMs (including DSLAM 51) connected to u-PE device 53, authentication of individual subscribers is based the supplicant's MAC address. Alternatively, some other logical identifier may be used.

In the network topology shown in FIG. 3, EAP messages are sent using the 802.1x transport protocol by supplicant 44 over Ethernet (shown by the dashed line) to u-PE 53 where they are processed by authenticator unit 58. The Ethernet can be of multiple Ethertypes, e.g., IP, PPPoE, AppleTalk, etc. In this example, Ethernet is shown carrying IP (path 56) and PPPoE (which itself carries IP; path 57). In the example of FIG. 3, the PPPoE protocol is shown using the same MAC address for both paths 56 & 57. In other words, unit 58 authenticates both Ethernet streams using the same MAC address.

In accordance with the present invention, different MAC addresses may be used, such that different Ethernet traffic streams may be authenticated separate from on another. For instance, voice and video services (paths 56 & 55) can be authenticated separately from the data service provided on path 57. The data service on path 57, for example, might be provided by an ISP such as America Online®, wherein the voice and video services are provided by a another SP (e.g., Horizon). In such a scenario, the use of different MAC addresses allows authentication of voice and video services separate from data services, essentially permitting authentication to occur on a per business relationship basis. It is appreciated that MAC address authentication for different application layer services may be located multiple hops back in the network, even crossing one or more aggregation boxes.

Another way to look at this aspect of the present invention is that access to the network via a physical port of an edge device may be opened (or closed) by Ethertype. Thus, authentication of non-IP end-user L2 & L3 services can be enabled on a per service basis, something that was not possible in prior art approaches. Additionally, EAP may be transported over PPPoE as well as 802.1x, which allows seamless integration with existing PPPoE AAA databases and user credentials. In fact, a variety of different EAP methods, such as Lightweight EAP (LEAP), Protected EAP (PEAP), Message Digest 5 (MD5), etc., can be seamlessly supported on the network topology of the present invention. Furthermore, returning messages from an authentication server can provide port configuration information or policy information in a way not supported by prior methods.

Practitioners in the networking arts will further appreciate that by splitting the video services at DSLAM 51 and providing for 802.1x authentication one hop back in u-PE 53, as shown in the network topology of FIG. 3, a customer can request to join a multicast video program (and view it) without having to pass through 802.1x authenticator unit 58. In other words, because the last point of replication is one hop down from where the 802.1x protocol is terminated in local access domain 39, the DSL subscriber can view video programs without having to pass a set of credentials. In certain cases, such a configuration is beneficial to DSLAM providers who desire to provide a basic set of broadcast video channels to their customers simply based on their physical connection.

Figure 4:
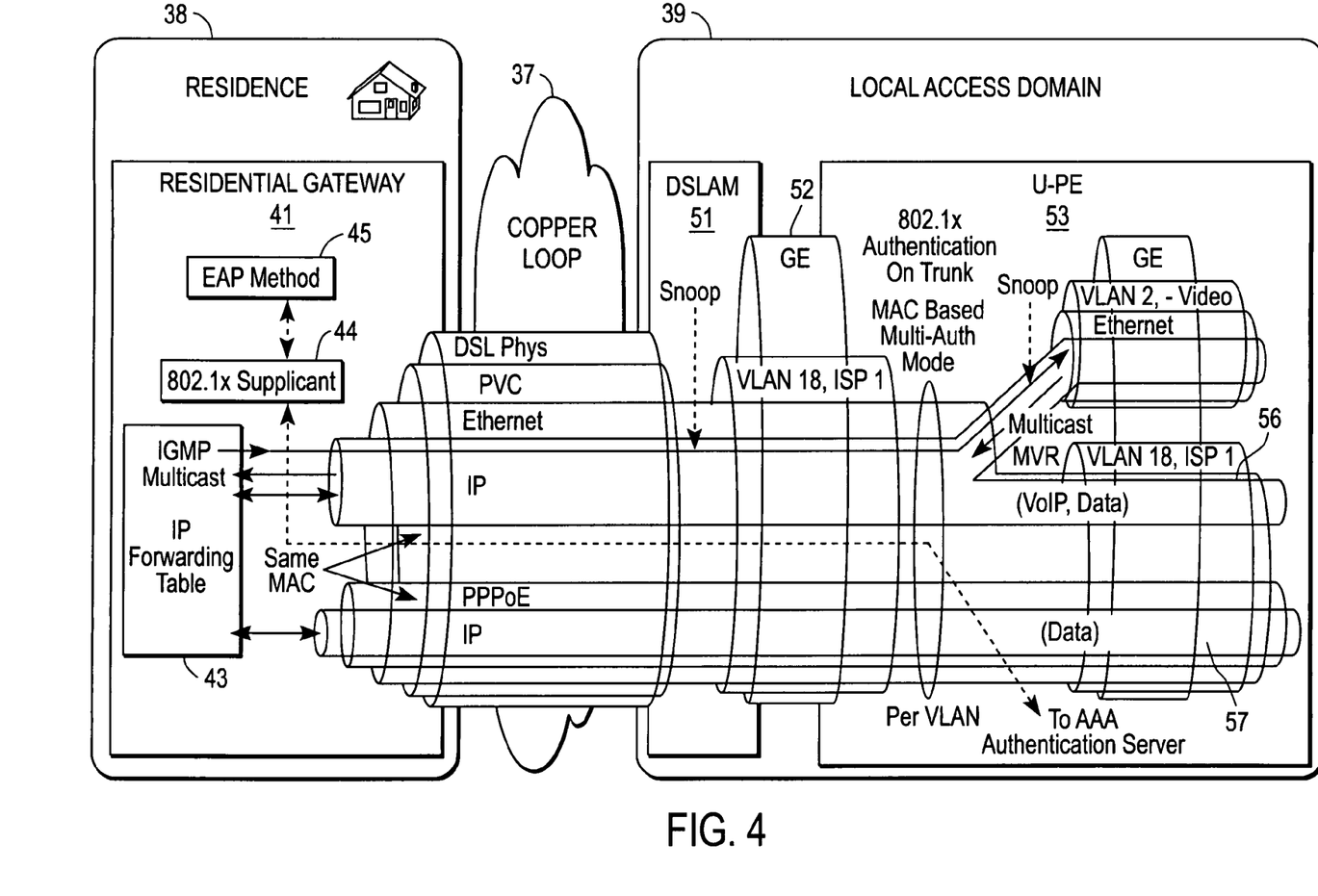
FIG. 4 is a diagram of a user network interface to a local access domain of a service provider network in accordance with another embodiment of the present invention.

FIG. 4 is a diagram of a user network interface to a local access domain of a service provider network in accordance with another embodiment of the present invention. The network topology diagram of FIG. 4 is basically the same as that shown in FIG. 3, except that in FIG. 4, the video service is split off from the voice and data services at u-PE 53 rather than at DSLAM 51. This configuration allows 802.1x authentication to be performed on the entire physical port, with acceptance or denial of all services based on a single MAC address. In the previous example of FIG. 3, individual services could have different authentication mechanisms with individual sets of rules. In the embodiment of FIG. 4, 802.1x applies to all services, with a supplicant's request to access the network being accepted or denied for all services, instead of physically opening or closing the network port on an individual service basis.

It should also be understood that elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A processor-implemented method of operation for a Broadband Remote Access Server (BRAS) device of an Ethernet access network, the method comprising:
    receiving an Extensible Authentication Protocol (EAP) message transported from a subscriber-premises device in compliance with an IEEE 802.1x compatible protocol;
    allowing or denying the subscriber-premises device access to the Ethernet access network on a per service basis based on a logical identifier contained in the EAP message, a first application layer service being allowed without passing of authentication credentials, a second application layer service being allowed only after authentication, the first and second application layer services comprising end-user Layer 2 (L2) and/or Layer 3 (L3) services, the authentication comprising:
    encapsulating subscriber identity information extracted from the EAP message in a Remote Authentication Dial-In User Service (RADIUS) authentication access request; and
    forwarding the RADIUS authentication access request to the RADIUS server for validation.

2. The processor-implemented method of claim 1 wherein the subscriber-premises device comprises a residential gateway (RG) device.

3. The processor-implemented method of claim 1 wherein the Ethernet access network comprises an Ethernet Digital Subscriber Line Access Multiplexer (DSLAM) aggregation network.

4. The processor-implemented method of claim 3 wherein the authentication further comprises:
    opening a port of the BRAS device to traffic that includes frames that contain information other than EAP messages.

5. The processor-implemented method of claim 1 wherein the logical identifier comprises a Media Access Control (MAC) address.

6. The processor-implemented method of claim 1 wherein the authentication further comprises:
    executing a Dynamic Host Configuration Protocol (DHCP) process to provide the subscriber-premises device with an Internet protocol (IP) address.

7. A processor-implemented method of operation for a Broadband Remote Access Server (BRAS) device of a Service Provider (SP) subscriber Ethernet aggregation network, the method comprising:
- sending an Extensible Authentication Protocol (EAP) request message to a subscriber-premises device;
- receiving an EAP response identity packet from the subscriber-premises device, the EAP response identity packet being transported from the subscriber-premises device to the BRAS device in compliance with an IEEE 802.1x compatible protocol;
- extracting user identity information from the EAP response identity packet;
- encapsulating the user identity information in a network access request;
- forwarding the network access request to an 802.1x authentication server;
- sending a request message to the subscriber-premises device;
- receiving a Media Access Control (MAC) address and a request to join a multicast video program from the subscriber-premises device without end-user input based on a stored credential;
- permitting the subscriber-premises device to view the multicast video program without passing credentials to the 802.1x authentication server;
- sending the MAC address to the 802.1x authentication server;
- receiving a validation message from the 802.1x authentication server;
- authorizing traffic associated with a particular application layer service between the subscriber-premises device and the SP subscriber Ethernet aggregation network based on the MAC address, the particular application layer service comprising an end-user Layer 2 (L2) or Layer 3 (L3) service.

8. The processor-implemented method of claim 7 wherein the particular application layer service includes a voice over Internet protocol service.

9. The processor-implemented method of claim 7 wherein the particular application layer service includes a data service.

10. The processor-implemented method of claim 7 wherein the particular application layer service includes a video service.

11. The processor-implemented method of claim 7 further comprising:
- authorizing traffic associated with a different service between the subscriber-premises device and the SP subscriber Ethernet aggregation network based on a second MAC address.

12. The processor-implemented method of claim 7 wherein the 802.1x authentication server comprises an authentication, authorization, and accounting (AAA) server.

13. The processor-implemented method of claim 12 further comprising:
- opening a port of the BRAS device to traffic that includes frames that contain information other than EAP messages.

14. The processor-implemented method of claim 7 further comprising:
- executing a Dynamic Host Configuration Protocol (DHCP) process to provide the subscriber-premises device with an Internet protocol (IP) address.

15. A Broadband Remote Access Server (BRAS) device for association with an Ethernet access network, the BRAS device comprising:
- a physical port;
- an authenticator compatible with an IEEE 802.1x compatible protocol, the authenticator being configured to communicate with a supplicant device of a residential gateway (RG) device over the IEEE 802.1x compatible protocol, and with a Remote Authentication Dial-In User Service (RADIUS) server that stores credential information of the supplicant device via a Remote Authentication Dial-In User Service (RADIUS) protocol, the authenticator being operable to open the physical port to first traffic between the RG device and the Ethernet access network by Ethertype, with non-Internet Protocol (IP) end-user Layer 2 (L2) and Layer 3 (L3) services enabled on a per service basis responsive to receiving a message from the supplicant device without passing of authentication credentials, the message being transported from the supplicant device to the BRAS device in compliance with the IEEE 802.1x compatible protocol, the physical port being opened to second traffic between the RG device and the Ethernet access network only after authentication.

16. The BRAS device of claim 15 wherein a particular service associated with an Ethernet stream is identified by a Media Access Control (MAC) address.

17. The BRAS device of claim 16 wherein the particular service comprises a data service.

18. The BRAS device of claim 16 wherein the particular service comprises a video service.

19. A computer-readable memory encoded with a computer program for configuring a Broadband Remote Access Server (BRAS) device, when executed, the computer program being operable to:
- communicate with a subscriber-premises device via Extensible Authentication Protocol (EAP) messages carried over an IEEE 802.1x compatible protocol; and
- communicate with a Remote Authentication Dial-In User Service (RADIUS) server via a different protocol;
- open a physical port to traffic between the subscriber-premises device and an Ethernet access network by Ethertype, with non-Internet Protocol (IP) end-user Layer 2 (L2) and Layer 3 (L3) services enabled on a per service basis, a first service being provided without passing of credential information, an additional one or more services being provided upon validation of credential information provided by the subscriber-premises device without end-user input, the additional one or more services being associated with one or more corresponding Ethernet traffic streams, each of the additional one or more services being identified by a different Media Access Control (MAC) address.

20. The computer-readable memory of claim 19 wherein the first service comprises a multicast video program.

* * * * *